(12) United States Patent
Liu

(10) Patent No.: US 11,915,253 B2
(45) Date of Patent: *Feb. 27, 2024

(54) SYSTEM AND METHOD FOR ANALYZING CREDIBILITY OF CRYPTOCURRENCY-RELATED INFORMATION

(71) Applicant: Capital One Services, LLC, McLean, VA (US)

(72) Inventor: Zhe Liu, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/074,218

(22) Filed: Dec. 2, 2022

(65) Prior Publication Data

US 2023/0169526 A1 Jun. 1, 2023

Related U.S. Application Data

(63) Continuation of application No. 16/861,678, filed on Apr. 29, 2020, now Pat. No. 11,544,725, which is a
(Continued)

(51) Int. Cl.
*G06Q 40/00* (2023.01)
*G06Q 30/0202* (2023.01)
(Continued)

(52) U.S. Cl.
CPC .......... *G06Q 30/0202* (2013.01); *G06N 5/04* (2013.01); *G06N 20/00* (2019.01); *G06Q 30/0201* (2013.01); *G06Q 40/04* (2013.01)

(58) Field of Classification Search
CPC ..... G06Q 40/00; G06Q 30/0202; G06N 20/00
See application file for complete search history.

(56) References Cited

U.S. PATENT DOCUMENTS 8,442,891 B2   5/2013   Mendelsohn
8,560,420 B2   10/2013  Mendelsohn
(Continued)

FOREIGN PATENT DOCUMENTS

KR   2020007271         1/2020
KR   2020007271 A   *   1/2020   ......... G06Q 10/0637

OTHER PUBLICATIONS

Cryptocurrency price prediction using news and social media sentiment C Lamon, E Nielsen, E Redondo—SMU Data Sci. Rev, 2017—cs229.stanford.edu (Year: 2017).*
(Continued)

*Primary Examiner* — Lalita M Hamilton
(74) *Attorney, Agent, or Firm* — HUNTON ANDREWS KURTH LLP

(57) ABSTRACT

Embodiments disclosed herein provide for analyzing cryptocurrency-related information using artificial intelligence. The system and methods provide for: a credibility analysis engine configured to determine the credibility of the cryptocurrency-related information; an artificial intelligence engine configured to predict a cryptocurrency market trend based on the credibility of the cryptocurrency-related information; and a processor is configured to generate and execute a personalized trading decision based on the predicted cryptocurrency market trend.

20 Claims, 4 Drawing Sheets

System 100

Related U.S. Application Data continuation of application No. 16/449,743, filed on Jun. 24, 2019, now Pat. No. 10,679,229, which is a continuation of application No. 16/183,284, filed on Nov. 7, 2018, now Pat. No. 10,380,613.

(51) Int. Cl.
| | |
|---|---|
| *G06Q 30/0201* | (2023.01) |
| *G06N 5/04* | (2023.01) |
| *G06Q 40/04* | (2012.01) |
| *G06N 20/00* | (2019.01) |

(56) References Cited

U.S. PATENT DOCUMENTS

| | | |
|---|---|---|
| 2012/0246104 A1 | 9/2012 | Di Sciullo et al. |
| 2012/0296845 A1 | 11/2012 | Andrews et al. |
| 2017/0270492 A1 | 9/2017 | Donovan et al. |
| 2018/0122006 A1 | 5/2018 | Kraemer et al. |
| 2018/0204111 A1 | 7/2018 | Zadeh et al. |
| 2018/0285996 A1 | 10/2018 | Ma |
| 2018/0341910 A1 | 11/2018 | Broveleit |
| 2019/0013934 A1 | 1/2019 | Mercuri et al. |

OTHER PUBLICATIONS

Dale, O.; "Introducing Robo Advisor Coin: A Cryptocurrency Forecast Platform", Robo Adviser Coin: Cryptocurrency Forecast Platform Info & review, https://blockonomi.com/robo-advisor-coin/, Nov. 7, 2017 (21 pages).

Responsive: AI-Driven Online Wealth Management, https://www.responsive.ai/ (6 pages).

VantagePoint for Crytocurrency Traders, www.vantagepointssoftware.com/software/cryptocurrencies/.

Peculium: Build your bright future, www.peculium.io, (33 pages).

When Blockchain Tech Meets Robe-Advisers—Hacker Noon, (3 pages).

What's Next: Innovations in the pipelines of local companies, Scientists and engineers, San Diego Business Journal, 19. 21:33A(1), CBJ, L.P. (May 21, 2018) (Year: 2018).

C. Lamon et al., "Crytocurrency price prediction using news and social media sentiment", SMU Data Sci Rev., 2017—cs229.standor.edu (Year: 2017).

\* cited by examiner

System 100

Analysis Engine 110

SYSTEM AND METHOD FOR ANALYZING CREDIBILITY OF CRYPTOCURRENCY-RELATED INFORMATION

CROSS-REFERENCE TO RELATED APPLICATIONS

The subject application is a continuation of U.S. patent application Ser. No. 16/861,678 filed Apr. 29, 2020, which is a is a continuation of U.S. patent application Ser. No. 16/449,743 filed Jun. 24, 2019, now U.S. Pat. No. 10,679,229, which is a is a continuation of U.S. patent application Ser. No. 16/183,284 filed Nov. 7, 2018, now U.S. Pat. No. 10,380,613, the contents of which are hereby incorporated by reference their entireties.

TECHNICAL FIELD

The present application relates to improved systems and methods for analyzing cryptocurrency-related information using artificial intelligence.

BACKGROUND

Cryptocurrencies are a relatively new market and are generally associated with high volatility, profit, and risk, as well as limited historical data. As with many nascent markets, many cryptocurrency investors rushed into the market without adequate knowledge and experience in either trading or cryptocurrencies. In fact, many of the cryptocurrency investors were trapped by short-term market movement and lost money quickly. Further, unlike many other markets, cryptocurrencies trade 24/7, thereby requiring traders to make decisions at all times throughout the day. As such, in order to make the most-informed decision possible, the traders are also required to monitor information from a variety of sources. For example, a cryptocurrency's market price may be influenced by reported news (e.g., regulatory news, news about exchanges, stock market performance news, etc.), rumors, discussions, influencer's opinions on social media (e.g., Twitter, Reddit, YouTube, Telegram, etc.), and special events such as initial coin offerings (ICOs), airdrops, forks, hacks, rebranding, etc. Further, the informed investor would also need to know about the blockchain technology behind the coins or tokens as well as their intended use cases, roadmap, and progress. However, it would be impossible for human traders to track all of the above-mentioned cryptocurrency-related data and respond to that data in real time. Further, it would also be difficult to verify the credibility of the cryptocurrency-related information in real time. In particular, it is difficult to verify the credibility of speculation, rumors, opinions, and other information posted on social media and elsewhere.

Accordingly, there is a need for a centralized platform that analyzes speculation, news, and other cryptocurrency-related information as well as provides a recommendation and/or implements the provided recommendation.

DESCRIPTION OF EMBODIMENTS

Figure 1A:
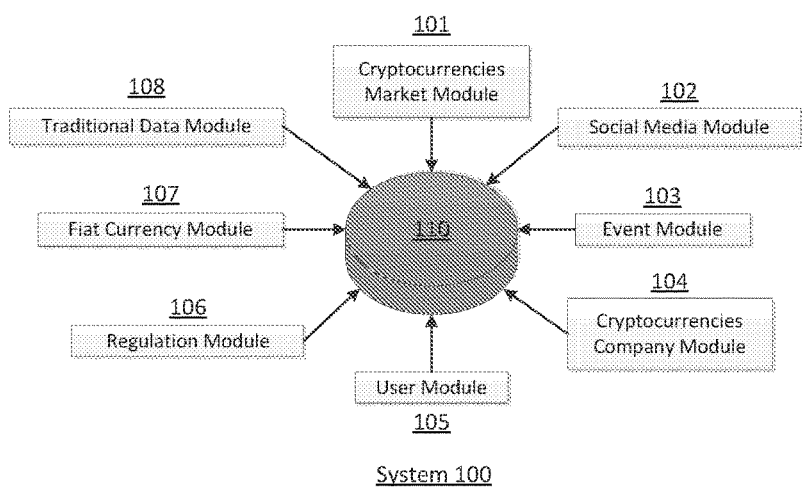
FIG. 1A illustrates an example embodiment of a system for analyzing cryptocurrency-related information.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

One aspect of the present disclosure is to provide systems and methods for analyzing cryptocurrency-related information using artificial intelligence. The systems and methods herein address at least one of the problems discussed above.

According to an embodiment, a system for analyzing cryptocurrency-related information using artificial intelligence including: (i) a plurality of modules, each of the plurality modules associated with a different type of the cryptocurrency-related information; (ii) a credibility analysis engine, wherein the credibility analysis engine is configured to: simultaneously receive, in real time, the cryptocurrency-related information from the plurality of modules; determine the credibility of the cryptocurrency-related information based on an analysis of historical information associated with the cryptocurrency-related information, wherein the analysis includes a comparison of the historical information and corresponding real-time events; assign a weighting to the cryptocurrency-related information based on the analysis, wherein the historical information having a higher congruence with the corresponding real-time events being given a higher weighting than the historical information having a lower congruence with the corresponding real-time events; (iii) an artificial intelligence engine, wherein the artificial intelligence is configured to: receive (a) the cryptocurrency-related information from the plurality of modules and (b) the corresponding weighting for each of the cryptocurrency-related information; and predict a cryptocurrency market trend based on the received cryptocurrency-related information and corresponding weighting; and (iv) a processor, wherein the processor is configured to: generate a personalized trading decision based on the predicted cryptocurrency market trend; and execute the personalized trading decision.

According to an embodiment, a method for analyzing cryptocurrency-related information using artificial intelligence includes: receiving, at credibility analysis engine, the cryptocurrency-related information from a plurality of modules, wherein the cryptocurrency-related information is received simultaneously in real time; determining, with the credibility analysis engine, the credibility of the cryptocurrency-related information based on an analysis of historical information associated with the cryptocurrency-related information, wherein the analysis includes a comparison of the historical information and corresponding real-time events; assigning, with the credibility analysis engine, a weighting to the cryptocurrency-related information based on the analysis, wherein the historical information having a higher congruence with the corresponding real-time events being given a higher weighting than the historical information having a lower congruence with the corresponding real-time events; receiving, with an artificial intelligence engine, (i) the cryptocurrency-related information from the plurality of modules and (ii) the corresponding weighting for each of the cryptocurrency-related information; predicting, with the artificial intelligence engine, a cryptocurrency market trend based on the received cryptocurrency-related information and corresponding weighting; generating, with a processor, a personalized trading decision based on the predicted cryptocurrency market trend; and executing, with the processor, the personalized trading decision.

According to an embodiment, a system for analyzing cryptocurrency-related information using artificial intelligence includes: (i) a server, wherein the server includes: a plurality of modules, each of the plurality modules associated with a different type of the cryptocurrency-related information; a credibility analysis engine, wherein the credibility analysis engine is configured to determine the credibility of the cryptocurrency-related information based on an analysis of historical information associated with the cryptocurrency-related information, wherein the analysis includes a comparison of the historical information and corresponding real-time events; and an artificial intelligence engine, wherein the artificial intelligence is configured to predict a cryptocurrency market trend based on the credibility of the cryptocurrency-related information; and (ii) a mobile device, wherein the mobile device includes a processor, wherein the processor is configured to generate and execute a personalized trading decision based on the predicted cryptocurrency market trend.

FIG. 1A illustrates an example embodiment of a system for analyzing cryptocurrency-related information. In an embodiment, as depicted in the figure, a system 100 includes a plurality of modules 101 to 108 and an analysis engine 110. In an embodiment, the plurality of modules include a cryptocurrencies market module 101, a social media module 102, an event module 103, a cryptocurrencies company module 104, a user module 105, a regulation module 106, a fiat currency module 107, and a traditional data module 108. Each of the plurality of modules may be associated with a different type of cryptocurrency-related information. In an embodiment, the analysis engine 110 may be a central platform to receive cryptocurrency-related information provided by the plurality of modules 101 to 108. For example, the analysis engine 110 may be a data server (e.g., a back-end component) that interacts with each of the plurality of modules 101 to 108. Further, the plurality of modules 101 to 108 may also be implemented in at least one data server. In an embodiment, the plurality of modules 101 to 108 and the analysis engine 110 may be implemented in the same data server. However, in another embodiment, the plurality of modules 101 to 108 and the analysis engine 110 may be implemented in a plurality of different data servers.

Figure 1B:
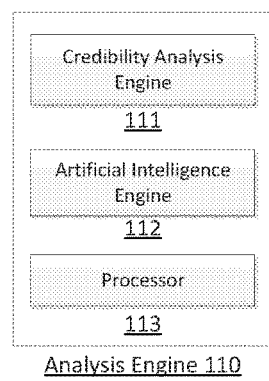
FIG. 1B illustrates an example embodiment of the analysis engine depicted in FIG. 1A.

FIG. 1B illustrates an example embodiment of the analysis engine depicted in FIG. 1A. As depicted in the figure, the analysis engine 110 includes a credibility analysis engine 111, an artificial intelligence engine 112, and a processor 113. In an embodiment, the credibility analysis engine 111 is configured to identify the source of market-influencing information (e.g. predictions of price, upcoming event), gather historical data in similar nature from the same source, and gather related factual data to verify the accuracy of the data source, and assign a credibility weight on the current influence data from this source in order to predict how the market acts. In an embodiment, the credibility analysis engine 111 is configured to determine the credibility of cryptocurrency-related information from the plurality of modules 101 to 108. In an embodiment, the credibility analysis engine 111 may simultaneously receive, in real time, the cryptocurrency-related information from the plurality of modules 101 to 108. The cryptocurrency-related information may be information such as speculation, rumors, opinions, and other information posted on social media. For example, the cryptocurrency-related information may correspond to an influencer's opinions, recommendations, predictions, etc. In an embodiment, the credibility of the social media data may be evaluate based on the popularity of the social media data post as well as the social media data poster. In an embodiment, the popularity of the social media post may be determined based on the number of "views," "likes," "dislikes," "comments," "shares," "retweets," and "reposts" associated with the social media post. For example, posts with higher "views," "likes," "comments," "shares," "retweets," or "reposts" will have a higher credibility weighting. Similarly, posts with fewer "views," "likes," "comments," "shares," "retweets," or "reposts" will have a lower credibility weighting. In an embodiment, the content and sentiment in the comments are also considered (e.g., via natural language processing and image recognition). Further, any "dislikes" or any disagreement, doubt, questions, negative emojis, or sentiments expressed in the comments (e.g., understood through natural language processing technology and image recognition technology) will result in a lowering of the credibility weighting. Further, the number of followers or subscribers of the social media data poster can determine the popularity of the social media data poster. Therefore, social media posters with a higher number of followers or subscribers will have a higher credibility weighting. Similarly, social media posters with a lower number of followers or subscribers will have a lower credibility weighting. Further, the credibility of the social media data may also be determined by comparing the social media data post to previous ones made by the social media data poster. In particular, the credibility analysis engine 111 determines how prescient the previous social media data posts were. For example, if the credibility analysis engine 111 determines that the previous social media data posts were in congruence with upcoming events more often than not, the current social media data post will have a higher credibility than if the previous social media data posts were in congruence with upcoming events less often than not. For example, assuming Investor A tweeted that Coin X, Y, Z will be the "hot" coins of the next month. After receiving this data (e.g., influencing factor) from the social media module, the credibility analysis engine 111 will (i) search and collect past predictions made by Investor A on Twitter and other social media and (ii) use actual market data in the corresponding time frame to assess how credible A's predication is in the past (e.g., credibility score). The credibility analysis engine 111 then analyzes how social media users' react to this tweet by counting the number of views, likes, shares, comments, retweets, parsing the content and sentiments expressed in comments (natural language processing, image recognition, video recognition), and checking if the tweet received any support (retweeted, shared, liked, commented, cited) by credible sources (news media, official account, influencer, etc.), all of which indicates the level of influence.

In an embodiment, the artificial intelligence engine 112 is configured to collect real-time data from the plurality of modules 101 to 108, identify a limited number of essential influencing factors at a given moment, assign each influencing factor with a credibility score provided by the credibility analysis engine 111. In addition, the artificial intelligence engine 112 measures the level of influence of each influencing factor, by looking at its impact (e.g., magnitude, width, duration) on investor sentiments and reactions on social media (e.g., comments, likes, posts, etc.) and market (e.g., orders placed and fulfilled). Then the artificial intelligence engine 112 correlates the influencing factor, the credibility score, and the level of influence with the actual market activities. In other words, the price forecast result is a function of influencing factor, credibility score, and level of influence. Specifically, the artificial intelligence engine 112 collects a large amount of historical cases and utilizes machine learning to identify patterns and correlations in order to develop hypotheses on a function that leads the three input variables (e.g., influencing factor, credibility score, and level of influence) to the final result. Further, the artificial intelligence engine 112 validates the accuracy of an initial hypothesis by collecting and applying the hypothesis to additional historical and on-going cases, and incrementally refining the prediction algorithm. Further, when a new influence factor is identified, the artificial intelligence engine 112 applies the prediction algorithm to predict market trends in the short term and long term.

Further, the artificial intelligence engine 112 is also configured to perform a causal analysis to identify the cause and effect of market activities after receiving the credibility weightings of all of the received cryptocurrency-related information. For example, if the price of a Coin A suddenly went up 30% sometime in the past, the artificial engine 112 is configured to acquire all the news, rumors, social media discussions, and influencer recommendations related to this coin before the 30% jump, and identifies what type of event(s) caused the price change. In an embodiment, after the artificial intelligence engine 112 collects, analyzes, and synthesizes a few hundred (or thousand) similar cases, it will establish and incrementally enhance a pretty reliable assessment on the impact of potential events. Accordingly, when a similar event happens again to Coin A or a different coin/token, the artificial intelligence engine 112 will use historical learning (e.g., machine learning) to forecast on the level of its impact and the affecting timeline. In other words, the artificial intelligence engine 112 is configured to (i) retrospectively collect and analyze historical market performance data and other influencing data (e.g., social media, event, regulation, etc.) and (ii) use a machine learning algorithm to: (a) identify and measure their correlations, (b) build hypotheses and assign tentative weights on how the influencing factors may impact market activities, (c) identify and collect more similar cases from historical and current data, (d) generate market predictions based on initial hypotheses and weights, (e) verify predictions with actual market data, (f) incrementally adjust correlation hypotheses and weights, and (g) enhance the accuracy of the forecast algorithm based on the adjusting. Further, in an embodiment, the impact analysis performed by the artificial intelligence engine 112 does not only measure price and trading volume but also can measure timing and investor sentiment. For example, in an event where a cryptocurrency was stolen from an exchange, the machine learning algorithm employed by the artificial intelligence engine 112 can also determine the reach (i.e., number of views) and how quickly the news spread out, what investors said and felt (e.g., mood) on social media as the news was spreading out, how long it took for the initial fear, if any, to fade out, for the "buy-the-bottom" mood to arise, as well as for the market to bounce back up. Further, in an embodiment, the processor 113 is configured to generate and execute a personalized trading decision based on the predicted cryptocurrency market trend. The processor 30 is suitable for the execution of a computer program and may include, by way of example, both general and special purpose microprocessors, and any one or more processors of any kind of digital computer. Further, in an embodiment, the personalized trading decision can be based on certain user input, e.g., investment strategies and goals, desired timelines, and risk tolerances. For example, an Investor A may be provided with a plurality of investment choices, e.g., (i) $200 gain best case, $0 gain/loss worst case; (ii) $800 gain best case, $200 loss worst case; (iii) $2,600 gain best case, $800 loss worst case, and (iv) $4,800 gain best case, $2,400 loss worst case. Further, the Investor A may plan to withdraw a certain percentage (e.g., 20%) of their portfolio in one of: less than 1 month, 1 month to 6 months, 6 months to 12 months, 1-2 years, and 2 years or more. Further, the Investor A may also be provided with a plurality of risk tolerances, e.g., (i) 60% low risk/profit, 30% medium risk/profit, 10% high risk/profit, (ii) 30% low risk/low profit, 40% medium risk/profit, 30% high risk/profit, and (iii) 10% low risk/profit, 40% medium risk/profit, 50% high risk/profit.

Further, in an embodiment, the personalized trading decision can be executed (i) as result of a user's selection (e.g., the user intentionally selects to execute the personalized trading decision) or (ii) automatically with the processor 113. In an embodiment, by executing the personalized trading decision automatically with the processor 113, the system 100 is able to make trading decisions 24/7, in real time; thereby assuring that the personalized trading decision is operating on the most recent and relevant information. On the other hand, the processor 113 can also indicate to the user, e.g., via an alert, an ideal time to execute the personalized trading decision but allow the user to execute the personalized trading decision herself. Further, in an embodiment, the personalized trading decision can be executed with funds accessible by the processor 113. In an embodiment, the funds can be retrieved from at least one of a cryptocurrency and fiat funding account.

Figure 1C:
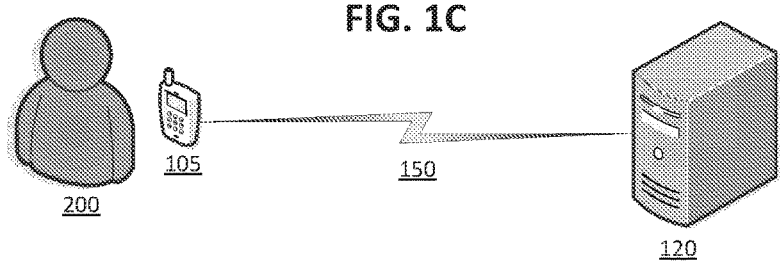
FIG. 1C illustrates an example embodiment of a user module interacting with a system for analyzing cryptocurrency-related information.

FIG. 1C illustrates an example embodiment of a user module interacting with a system for analyzing cryptocurrency-related information. In an embodiment, FIG. 1C depicts a user 200 using the user module 105 and a server 120. In an embodiment, the user module 105 may be a mobile device, e.g., smart phone, tablet, personal computer, etc. Further, in an embodiment, the server 120 includes all of the components of the system 100 except the user module 105. In other words, the server 120 includes the analysis engine 110, the cryptocurrencies market module 101, the social media module 102, the event module 103, the cryptocurrencies company module 104, the regulation module 106, the fiat currency module 107, and the traditional data module 108. Further, in an embodiment, the user module 105 may communicate with the server 120 by any form or medium of digital data communication, e.g., a communication network 150. Examples of a communication network 150 include a local area network (LAN) and a wide area network (WAN), e.g., the Internet.

Figure 1D:
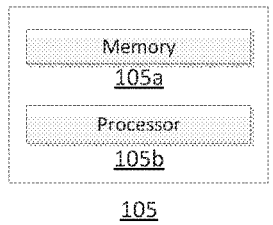
FIG. 1D illustrates an example embodiment of the user module depicted in FIG. 1C.

FIG. 1D illustrates an example embodiment of the user module depicted in FIG. 1C. As depicted in the figure, the user module 105 includes a memory 105a and a processor 105b. In an embodiment, the memory 105a may be utilized to store computer instructions and data including all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. Further, in an embodiment, the processor 105b is suitable for the execution of a computer program and may include, by way of example, both general and special purpose microprocessors, and any one or more processors of any kind of digital computer. For example, the processor 105b may receive instructions and data from the memory 105a. In an embodiment, the memory 105a and the processor 105b may be supplemented by, or incorporated in, special purpose logic circuitry. Further, in an embodiment, the user module 105 can be utilized to intentionally select an execution of a particular personalized trading decision. Once selected, the intention to execute a particular personalized may be communicated, e.g., via the communication network 150, to the server 120, where the processor 113 executes the particular personalized trading decision.

Figure 2A:
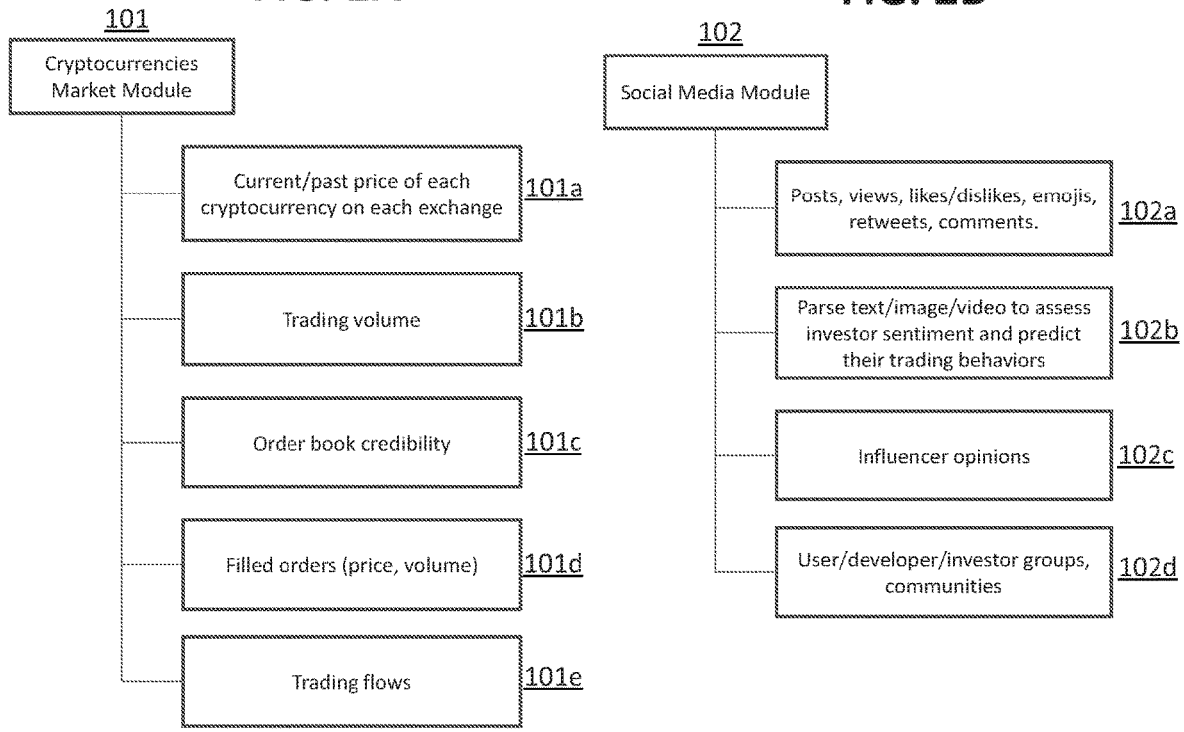
FIG. 2A illustrates an example embodiment of the cryptocurrencies market module depicted in FIG. 1A.

FIG. 2A illustrates an example embodiment of the cryptocurrencies market module depicted in FIG. 1A. In an embodiment, as depicted in the figure, the cryptocurrencies market module 101 receives a plurality of information 101a to 101e. For example, as indicated by 101a, the cryptocurrencies market module 101 receives the current and past price of each cryptocurrency on each available exchange. In particular, the current and past price of each cryptocurrency is retrieved via the cryptocurrency exchange APIs. Further, as indicated by 101b, the cryptocurrencies market module 101 also receives the trading volume for each available cryptocurrency. Further, the cryptocurrencies market module 101 also receives order book information for each cryptocurrency and is able to determine the credibility of the order book based on the received information as indicated by 101c. In an embodiment, the cryptocurrency market module 101 interacts with the credibility analysis engine 111 in order to determine the credibility of the order book. An order book is a dynamic and constantly updated list of buy and sell orders for a specific cryptocurrency, including the price and volume. It indicates investors' anticipated price to buy and sell. The credibility analysis engine 111 is configured to track order book activities, detect which placed orders are actually fulfilled, and which are just changing targets to manipulate investor's perception of demands and supplies at the moment. Fake orders rarely get fully fulfilled, and are constantly adjusted, dropped, and added back to avoid actual transactions. However, the fake orders are still close enough to the current price to be visible at the top of the order book and, therefore, manipulate perception. For example, assuming a cryptocurrency's current price is $8,000, someone can put a buy wall by placing an order for buying 1,000 of the cryptocurrency coin (or token) at $7,999. As such, all other traders have to place a buy order higher than this price; otherwise they will have to wait until all of the 1000 cryptocurrency coin (or tokens) are absorbed by the sellers. However, sometimes people set up a fake wall to drive the price up or down, and cancel the order before the actual price reached the order price. In an embodiment, the cryptocurrency market module 101 can detect real and fake buy/sell walls by using the credibility analysis engine 111 to analyze the current buy/sell wall with historical buy/sell walls for the particular cryptocurrency coin (or token) or other cryptocurrency coins (or tokens). Further, based on the credibility analysis of the current buy/sell wall, the cryptocurrency market module 101 can also analyze the short term and long term impact of the cryptocurrency price trend. In particular, the credibility analysis engine 111 analyzes perceived supply and demand as well as actual supply and demand in order to determine short term and long term impact of the cryptocurrency price trend. Further, in an embodiment, as indicated by 101d and 101e, the cryptocurrency market module also receives information regarding the filled order for each of the different cryptocurrencies as well as the trading flows. In an embodiment, the trading flows can correspond to flows between different cryptocurrency trading pairs (e.g., buying Ethereum with Bitcoin) or flows between fiat currency and cryptocurrencies (e.g., buying Ethereum with USD).

Figure 2B:
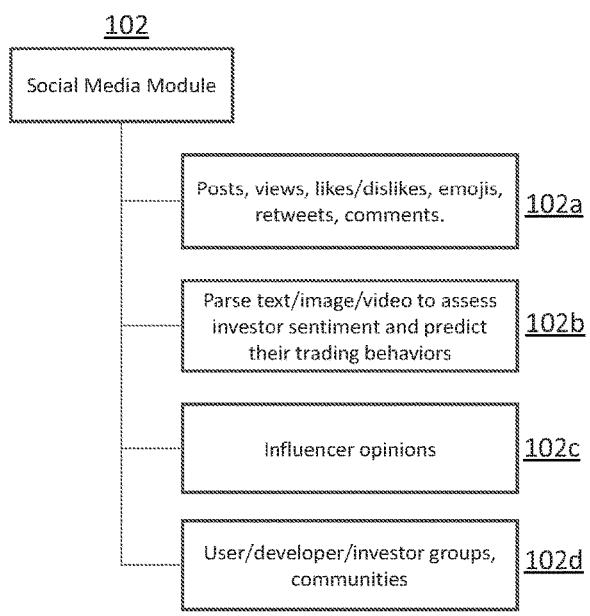
FIG. 2B illustrates an example embodiment of the social media module depicted in FIG. 1A.

FIG. 2B illustrates an example embodiment of the social media module depicted in FIG. 1A. In an embodiment, as depicted in the figure, the social media module 102 receives a plurality of information 102a to 102d. For example, as indicated by 102a, the social media module 102 can receive posts, views, likes, dislikes, emojis, retweets, and comments from a plurality of social media sites (e.g., Facebook, Twitter, Telegram, YouTube, Slack, Reddit, WeChat, and other US and international social media sites). Further, as indicated by 102b, the social media module is able parse texts (e.g., via natural language processing), images (e.g., image recognition), and video (e.g., speech recognition technology) to assess investor sentiment and predict their trading behaviors. Further, as indicated by 102c and 102d, the social media module is also configured to receive influencer opinions as well as information from user, developer, and/or investor groups or communities. In an embodiment, the social media module 102 interacts with the credibility analysis engine 111 in order to determine the credibility of the plurality of information 102a to 102d. For example, in an embodiment, the credibility of the social media data may be evaluated based on the popularity of the social media data post as well as the social media data poster. In an embodiment, the popularity of the social media post may be determined based on the number of "views," "likes," "dislikes," "comments," "shares," "retweets," and "reposts" associated with the social media post. For example, posts with higher "views," "likes," "comments," "shares," "retweets," or "reposts" will have a higher credibility weighting. Similarly, posts with fewer "views," "likes," "comments," "shares," "retweets," or "reposts" will have a lower credibility weighting. Further, any "dislikes" of the post will result in a lowering of the credibility weighting. Further, the number of followers or subscribers of the social media data poster can determine the popularity of the social media data poster. Therefore, social media posters with a higher number of followers or subscribers will have a higher credibility weighting. Similarly, social media posters with a lower number of followers or subscribers will have a lower credibility weighting. Further, the credibility of the social media data may also be determined by comparing the social media data post to previous ones made by the social media data poster. In particular, the credibility analysis engine 111 determines how prescient the previous social media data posts were. For example, if the credibility analysis engine 111 determines that the previous social media data posts were in congruence with upcoming events more often than not, the current social media data post will have a higher credibility than if the previous social media data posts were in congruence with upcoming events less often than not.

Figure 2C:
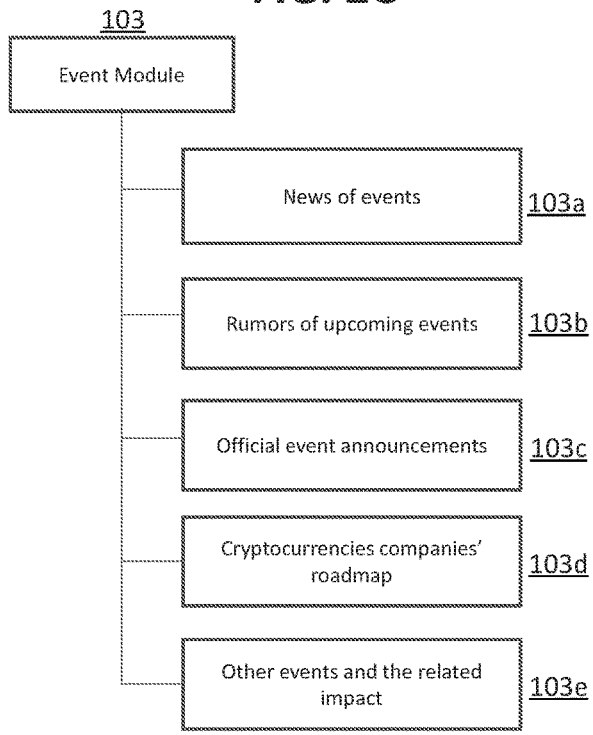
FIG. 2C illustrates an example embodiment of the event module depicted in FIG. 1A.

FIG. 2C illustrates an example embodiment of the event module depicted in FIG. 1A. In an embodiment, as depicted in the figure, the event module 103 receives a plurality of information 103*a* to 103*e*. For example, as indicated by 103*a*, the event module is configured to receive news of historical events, e.g., a new product (wallet, website, app) releases, launch on new exchanges, Initial Coin Offerings (ICO), partnership with traditional companies, airdrops, forks, hacks, re-brandings, etc. Further, as indicated by 103*b*, the event module is also configured to receive rumors of upcoming events. In an embodiment, the rumor may correspond to at least one of a new product releases, launch on new exchanges, ICOs, partnership with traditional companies, airdrops, forks, hacks, re-brandings, etc. Further, in an embodiment, the event module 103 is configured to interact with the credibility analysis engine 111 and the social media module 102 to determine the credibility of the rumored event. For example, based on a particular rumored upcoming event, the social media module 102 is configured to parse associated received text, image, and video to determine the credibility of the rumor. In particular, the credibility of the rumored event may be evaluated based on the popularity of the associated text, image, and video. In an embodiment, the popularity of the associated text, image, and video may be determined based on the number of corresponding "views," "likes," "dislikes," "comments," "shares," "retweets," and "reposts." For example, text, image, or video with higher "views," "likes," "comments," "shares," "retweets," or "reposts" will have a higher credibility weighting. Similarly, text, image, or video with fewer "views," "likes," "comments," "shares," "retweets," or "reposts" will have a lower credibility weighting. Further, any "dislikes" of the text, image, or video will result in a lowering of the credibility weighting. Further, the number of followers or subscribers of the text, image, or video poster can determine the popularity of the poster. Therefore, posters with a higher number of followers or subscribers will have a higher credibility weighting. Similarly, posters with a lower number of followers or subscribers will have a lower credibility weighting. Further, the credibility of the text, image, and video may also be determined by comparing the text, image, or video to previous ones made by the poster. In particular, the credibility analysis engine 111 determines how prescient the previous posts were. For example, if the credibility analysis engine 111 determines that the previous posts were in congruence with upcoming events more often than not, the current social media data post will have a higher credibility than if the previous social media data posts were in congruence with upcoming events less often than not. Further, as indicated by 103*c*, 103*d*, and 103*e*, the event module 103 is also configured to receive official event announcements, roadmaps for each of the cryptocurrency companies, and other events and the related impact. In an embodiment, the other events can correspond to holidays, pay day, tax day, and any of political, economic, and social events.

Figure 2D:
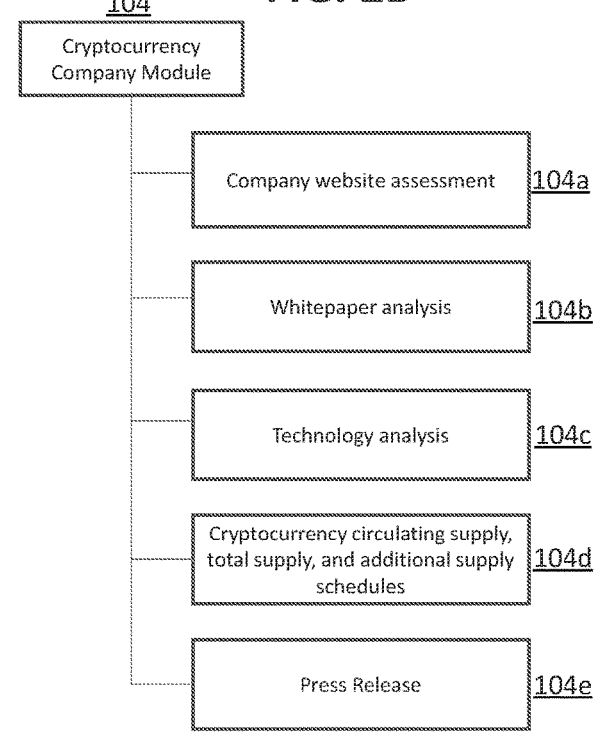
FIG. 2D illustrates an example embodiment of the cryptocurrency company module depicted in FIG. 1A.

FIG. 2D illustrates an example embodiment of the cryptocurrency company module depicted in FIG. 1A. In an embodiment, as depicted in the figure, the cryptocurrency company module 104 receives a plurality of information 104*a* to 104*e*. For example, as indicated by 104*a*, the cryptocurrency company module 104 is configured to perform a company website assessment. For instance, the cryptocurrency company module 104 is configured to assess the content, design, and staff of the cryptocurrency company. Further, as indicated by 104*b*, the cryptocurrency company module 104 is also configured to perform a whitepaper analysis of any associated white paper. For instance, the cryptocurrency company module 104 can assess the level of details, originality, writing quality of the whitepaper, indications of plagiarism, grammatical errors, keywords, and citations. Further, as indicated by 104*c*, the cryptocurrency company module 104 is also configured to perform an analysis of the underlying blockchain technology of the cryptocurrency company. For example, the cryptocurrency company module 104 is configured to analyze the originality, feasibility, maturity, viability, and scalability of the underlying blockchain technology. Further, as indicated by 104*d* and 104*e*, the cryptocurrency company module is also configured to receive the cryptocurrency circulating supply, total supply, and additional supply schedules, as well as any press release associated with the cryptocurrency company.

Figure 2E:
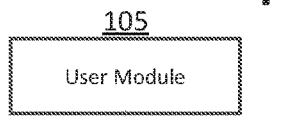
FIG. 2E illustrates an example embodiment of the user module depicted in FIG. 1A.

FIG. 2E illustrates an example embodiment of the user module depicted in FIG. 1A. In an embodiment, as depicted in the figure, the user module 105 receives a plurality of information 105*c* to 105*d*. For example, as indicated by 105*c*, the user module 105 is configured to receive, from the user, a desired investment strategy. In an embodiment, the desired investment strategy may include the investment goals, investment timelines, and risk tolerance. Further, as indicated by 105*d*, the user module 105 is also configured to receive funding information associated with the investment(s). For example, the user module 105 is configured to receive the funding account(s), the type of funding (e.g., cryptocurrency and/or fiat currency), and any other liquid investments.

Figure 2F:
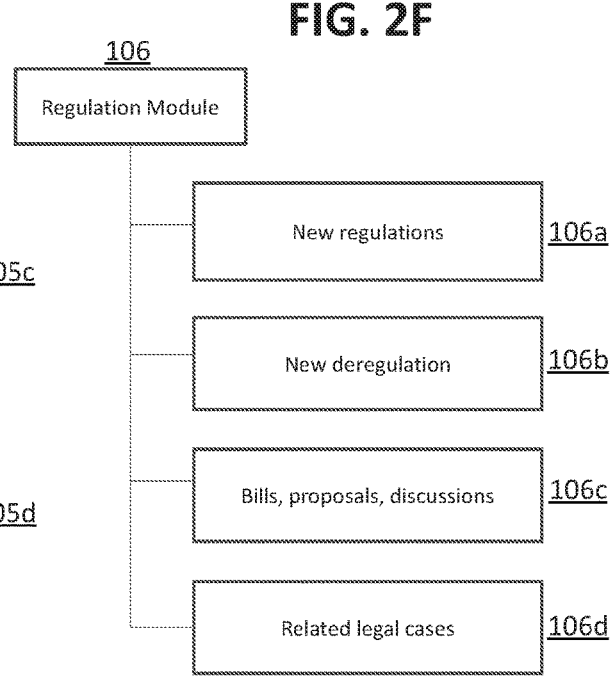
FIG. 2F illustrates an example embodiment of the regulation module depicted in FIG. 1A.

FIG. 2F illustrates an example embodiment of the regulation module depicted in FIG. 1A. In an embodiment, as depicted in the figure, the regulation module 106 receives a plurality of information 106*a* to 106*d*. In particular, the regulation module 106 is configured to receive information regarding any new regulations, any new deregulations, any bills, proposals, and other discussion, as well as any related cases.

Figure 2G:
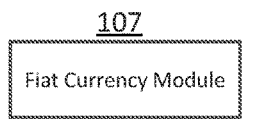
FIG. 2G illustrates an example embodiment of the fiat currency module depicted in FIG. 1A.

FIG. 2G illustrates an example embodiment of the fiat currency module depicted in FIG. 1A. In an embodiment, as depicted in the figure, the fiat currency module 107 receives a plurality of information 107*a* to 107*c*. In particular, the fiat currency module 107 is configured to receive information regarding the exchange rate between different fiat currencies, exchange account limits and speed, as well as the cross-border transfer speed, cost, and limits. Further, based on the received plurality of information 107*a* to 107*c*, the fiat currency module 107 is configured to optimize which fiat money should be used to buy/sell which cryptocurrency in which exchange and in which country.

Figure 2H:
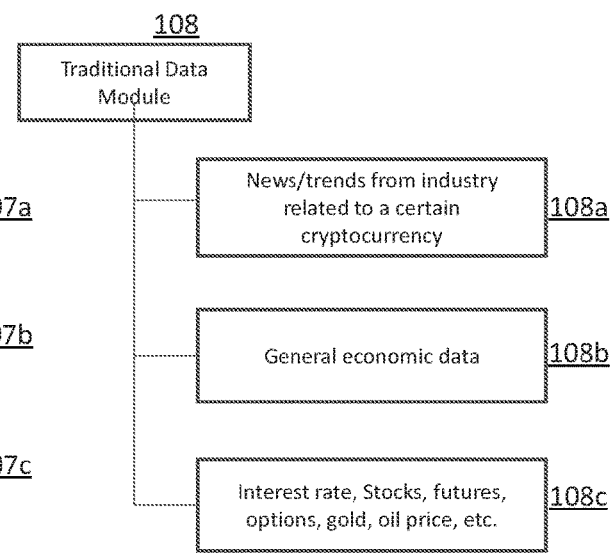
FIG. 2H illustrates an example embodiment of the traditional data module depicted in FIG. 1A.

FIG. 2H illustrates an example embodiment of the traditional data module depicted in FIG. 1A. In an embodiment, as depicted in the figure, the traditional data module 108 receives a plurality of information 108*a* to 108*c*. For example, the traditional data module 108 is configured to receive news and/or trends from an industry related to a certain cryptocurrency. For instance, a positive real world use case of a particular blockchain technology used in a separate industry (e.g., supply chain management) can positively impact the coin (or token) associated with a cryptocurrency using the same blockchain technology. Further, as indicated by 108b, the traditional data module is also configured to receive general economic data (e.g., GDP, unemployment rate, consumer confidence index, etc.). Lastly, as indicated by 108c, the traditional data module 108 is also configured to receive information regarding interest rates, stocks, futures, options, gold, oil price, etc.

Examples of the system 100 analyzing cryptocurrency-related information are provided below. For example, in an embodiment, a certain "tweet" may suggest the bullish trend of bitcoin in the long term. The "tweet" may include text as well as an image. Further, the associated Twitter account has 9924 followers and 6491 tweets. In an embodiment, the social media module 102 detects this new information using language processing technology to identify and make sense of keywords (e.g., $BTC, bullish, bear, drops, ATH, etc.) and image recognition technology to understand that the image in the "tweet" is a chart showing an upward trend. Further, in an embodiment, the credibility analysis engine 111 looks at all of the tweets from this account, identifies past predictions, verifies their accuracy with actual market trends, and generates an overall credibility score for the associated Twitter account. In an embodiment, the credibility analysis engine may also analyze the quality of a specific "tweet." In particular, the credibility analysis engine 111 may provide evidence (e.g., image/chart) in supporting the determined credibility score for the specific "tweet." As such, based on both the credibility of the associated Twitter account and the credibility of the specific "tweet," the credibility analysis engine 111 may determine the final credibility score for this detected piece of information. Further, the credibility analysis engine 111 also monitors other people's reactions (e.g., comments, "retweets," likes, etc.) to this "tweet" as well as how fast and wide it spread out. Then, assuming the credibility score is 60 and influence level score is 25, the artificial intelligence engine 112 will search historical events with similar credibility scores and influence levels and determine how much they impacted the market performance. The artificial intelligence engine 112 then aggregates the results, normalizes the sample size, and calculates an expected value of price change. For example, assuming the price of 40% cases went up about 10% and the price of the other 60% of cases went up about 20%, the expected price change should be 16% (i.e., 0.4×0.1+0.6×0.2).

In another embodiment, a cryptocurrency influencer with 110 k subscribers on Telegram may suggest that a cryptocurrency's price will go up because of three anticipated events: (i) the cryptocurrency company will be exhibited at a blockchain festival, (ii) the cryptocurrency company will be undergoing a rebranding event, and (iii) the cryptocurrency company will release new features. In an embodiment, the credibility analysis engine 111 will collect information from other sources to verify the credibility of this specific post, like how many times these events or rumors of events are also mentioned in other social media discussions, news, or the cryptocurrency company's official website in order to assess an overall credibility score for this Telegram user account. For example, the overall credibility score for the Telegram post may be 70. Then, the credibility analysis engine may determine the level of influence for the particular post. For example, assuming eleven thousand people viewed the post and eight hundred people shared and/or cited the post, the level of influence score may be 90. After which, the artificial intelligence engine 112 determines how a historical post with this level of credibility and influence changed the market performance in the past, and, based on this information, predicts how this post is likely to influence the cryptocurrency price in the weeks to come.

Figure 3:
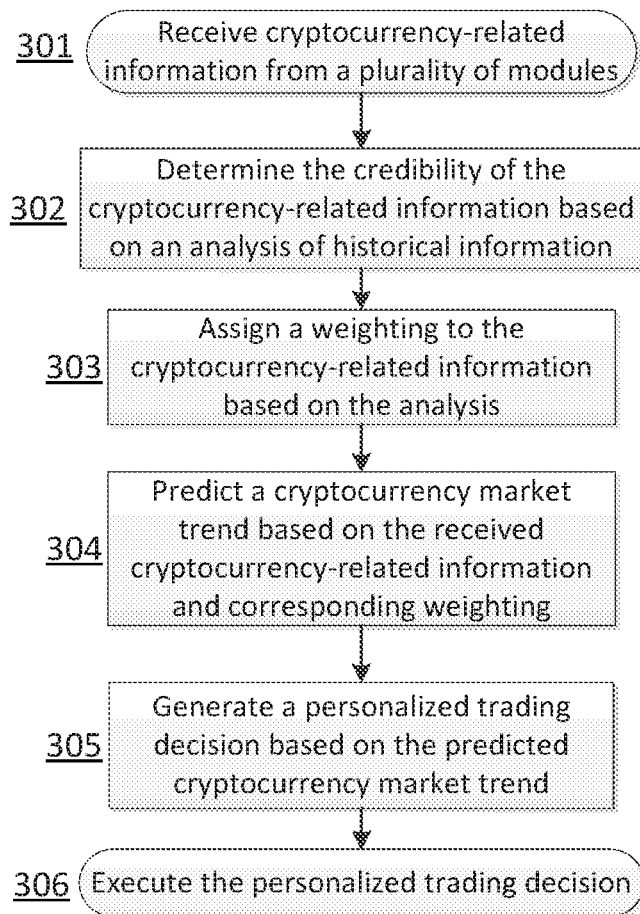
FIG. 3 illustrates an example embodiment of a method for analyzing cryptocurrency-related information.

FIG. 3 illustrates an example embodiment of a method for analyzing cryptocurrency-related information. In an embodiment, as indicated by step 301, the credibility analysis engine 111 receives cryptocurrency-related information from a plurality of modules 101 to 108. In an embodiment, the cryptocurrency-related information can be received simultaneously in real time. Then, in step 302, the credibility analysis engine 111 determines the credibility of the cryptocurrency-related information based on an analysis of historical information associated with the cryptocurrency-related information. In an embodiment, the analysis may include a comparison of the historical information and corresponding real-time events. Then, in step 303, the credibility analysis engine 111 assigns a weighting to the cryptocurrency-related information based on the analysis. In an embodiment, historical information having a higher congruence with the corresponding real-time events can be given a higher weighting than the historical information having a lower congruence with the corresponding real-time events. Then, in step 304, after the artificial intelligence engine 112 receives the cryptocurrency-related information and the corresponding weighting, the artificial intelligence engine 112 generates a cryptocurrency market trend prediction based on the received cryptocurrency-related information and corresponding weighting. Then, in step 305, the processor 313 generates a personalized trading decision based on the predicted cryptocurrency market trend. Lastly, in step 306, the processor executes the personalized trading decision.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

In the foregoing Description of Embodiments, various features may be grouped together in a single embodiment for purposes of streamlining the disclosure. This method of disclosure is not to be interpreted as reflecting an intention that the claims require more features than are expressly recited in each claim. Rather, as the following claims reflect, inventive aspects lie in less than all features of a single foregoing disclosed embodiment. Thus, the following claims are hereby incorporated into this Description of Embodiments, with each claim standing on its own as a separate embodiment of the invention.

Moreover, it will be apparent to those skilled in the art from consideration of the specification and practice of the present disclosure that various modifications and variations can be made to the disclosed systems without departing from the scope of the disclosure, as claimed. Thus, it is intended that the specification and examples be considered as exemplary only, with a true scope of the present disclosure being indicated by the following claims and their equivalents.

The invention claimed is:

1. A system for analyzing cryptocurrency-related information using artificial intelligence, the system comprising:
one or more modules collecting cryptocurrency-related information, the one or more modules comprising an event module, wherein the event module:
receives news information of historical events, and
receives rumors of upcoming events;
an artificial intelligence engine, wherein the artificial intelligence engine:
receives, from the one or more modules, the cryptocurrency-related information,
receives, from a credibility analysis engine, the corresponding weighting for each of the cryptocurrency-related information, and
predicts a cryptocurrency market trend based on the received cryptocurrency-related information and corresponding weighting; and
a processor, wherein the processor generates a trading decision based on the predicted cryptocurrency market trend.

2. The system of claim 1, wherein the historical events comprise at least one selected from the group of a new product release, a launch on a new exchange, an initial coin offering, a partnership with a company, an airdrop, a fork, and a re-branding.

3. The system of claim 2, wherein the new product comprises at least one selected from the group of a new wallet, a new website, and a new app.

4. The system of claim 1, wherein the upcoming events comprises at least one selected from the group of a new product release, a launch on a new exchange, an initial coin offering, a partnership with a company, an airdrop, a fork, and a re-branding.

5. The system of claim 1, wherein:
the one or more modules further comprise a social media module, and
the social media module:
receives, from at least one social media data source, at least one selected from the group of text, image, and video relating to the rumors of upcoming events, and
parses the received at least one selected from the group of text, image, and video to determine a credibility of the rumors of upcoming events.

6. The system of claim 5, wherein the social media module evaluates the credibility of the rumors of upcoming events based on a popularity of the received at least one selected from the group of text, images, and video.

7. The system of claim 6, wherein the social media module determines the popularity of the received at least one selected from the group of text, images, and video based on a number of social media interactions.

8. The system of claim 7, wherein the social media interactions comprise at least one selected from the group of views, likes, dislikes, comments, shares, retweets, and reposts.

9. The system of claim 7, wherein a higher number of social media interactions is given a higher credibility.

10. The system of claim 7, wherein a lower number of social media interactions is given a lower credibility.

11. A method for analyzing cryptocurrency-related information using artificial intelligence, the method comprising:
receiving, by an event module collecting cryptocurrency-related information, news information of historical events;
receiving, by the event module collecting cryptocurrency-related information, rumors of upcoming events;
receiving, by an artificial intelligence engine from the one or more modules, the cryptocurrency-related information;
receiving, by the artificial intelligence engine from a credibility analysis engine, the corresponding weighting for each of the cryptocurrency-related information;
predicting, by the artificial intelligence engine, a cryptocurrency market trend based on the received cryptocurrency-related information and corresponding weighting; and
generating, by a processor, a trading decision based on the predicted cryptocurrency market trend.

12. The method of claim 11, wherein the trading decision is further based on a user input comprising at least one selected from the group of an investment strategy, an investment goal, a desired timeline, and a risk tolerance.

13. The method of claim 11, further comprising executing, by the processor, the trading decision.

14. The method of claim 13, further comprising retrieving, by the processor prior to executing the trading decision, funds from at least one selected from the group of a cryptocurrency funding account and a fiat currency funding account.

15. The method of claim 11, wherein:
the credibility analysis engine assigns the weighting to the cryptocurrency-related information based on the analysis of historical information, and
the historical information having a higher congruence with the corresponding real-time events being given a higher weighting than the historical information having a lower congruence with the corresponding real-time events.

16. The method of claim 11, further comprising receiving, by a cryptocurrencies market module, information related to at least one selected from the group of current and past prices of each cryptocurrency on one or more exchanges, trading volume for each cryptocurrency on one or more exchanges, order books for each cryptocurrency on one or more exchanges, filled orders for each cryptocurrency on one or more exchanges, and trading flows for each cryptocurrency on one or more exchanges.

17. A computer readable non-transitory medium comprising instructions for execution by a computer hardware arrangement, wherein upon execution of the instructions the computer hardware arrangement is configured to perform procedures comprising:
receiving, by an event module collecting cryptocurrency-related information, news information of historical events;

receiving, by the event module collecting cryptocurrency-related information, rumors of upcoming events;

receiving, by an artificial intelligence engine from the event module, the cryptocurrency-related information;

receiving, by the artificial intelligence engine from a credibility analysis engine, the corresponding weighting for each of the cryptocurrency-related information;

predicting, by the artificial intelligence engine, a cryptocurrency market trend based on the received cryptocurrency-related information and corresponding weighting; and generating, by a processor, a trading decision based on the predicted cryptocurrency market trend.

18. The computer readable non-transitory medium of claim 17, the procedures further comprising:

receiving, by a cryptocurrency company module, information relating to at least one cryptocurrency company website associated with at least one cryptocurrency company; and performing, by the cryptocurrency company module, an assessment of at least one selected from the group of content of the at least one company web site, design of the at least one company website, and staff of the at least one company website.

19. The computer readable non-transitory medium of claim 18, the procedures further:

receiving, by the cryptocurrency company module, information relating to at least one whitepaper associated with the at least one cryptocurrency company; and parsing the at least one whitepaper, wherein the parsing includes an assessment of at least one selected from the group of a level of detail of the at least one whitepaper, originality of the at least one whitepaper, writing quality of the at least one whitepaper, indications of plagiarism of the at least one whitepaper, grammatical errors of the at least one whitepaper, keywords of the at least one whitepaper, and citations of the at least one whitepaper.

20. The computer readable non-transitory medium of claim 19, the procedures further:

receiving, by the cryptocurrency company module, information relating to at least one blockchain technology associated with the at least one cryptocurrency company; and analyzing, by the cryptocurrency module, at least one selected from the group of originality of the at least one blockchain technology, feasibility of the at least one blockchain technology, maturity of the at least one blockchain technology, viability of the at least one blockchain technology, and scalability of the at least one blockchain technology.

* * * * *